United States Patent
Parker et al.

(10) Patent No.: US 9,908,167 B1
(45) Date of Patent: Mar. 6, 2018

(54) DISK DRIVE TOLERANCE RING WITH EDGE ROUNDING FROM OPPOSITE MAJOR FACES

(71) Applicants: Western Digital Technologies, Inc., Irvine, CA (US); IntriPlex Technologies, Inc., Goleta, CA (US)

(72) Inventors: Joshua Parker, Huntington Beach, CA (US); Frederic C. Petersen, Santa Barbara, CA (US); Shawn P. Couture, Santa Barbara, CA (US); Prabheesh Balakrishnan Kuniyil, Kerala (IN); Bob A. Nykanen, Covinton, GA (US)

(73) Assignees: Western Digital Technologies, Inc., Irvine, CA (US); Intri-Plex Technologies, Inc., Santa Barbara, CA (US)

( * ) Notice: Subject to any disclaimer, the term of this patent is extended or adjusted under 35 U.S.C. 154(b) by 354 days.

(21) Appl. No.: 14/636,077

(22) Filed: Mar. 2, 2015

(51) Int. Cl.
  *G11B 5/48* (2006.01)
  *B21D 35/00* (2006.01)
  *B21D 11/20* (2006.01)
  *F16D 1/08* (2006.01)

(52) U.S. Cl.
  CPC .......... *B21D 35/001* (2013.01); *B21D 11/203* (2013.01); *F16D 1/0829* (2013.01); *G11B 5/4813* (2013.01)

(58) Field of Classification Search
  CPC .... G11B 5/4806; G11B 5/4813; F16D 1/0829
  USPC ......... 360/265.2, 265.4, 265.6; 403/371, 372
  See application file for complete search history.

(56) References Cited

U.S. PATENT DOCUMENTS

| | | |
|---|---|---|
| 2,508,758 A | 5/1950 | Hollerith |
| 2,919,611 A | 8/1955 | Nichols |
| 2,722,047 A | 11/1955 | Cousino |
| 2,931,412 A | 4/1960 | Wing |
| 3,061,386 A | 10/1962 | Dix et al. |
| 3,402,586 A | 9/1968 | Muller |
| 3,455,004 A | 7/1969 | Tethal |
| 3,456,473 A | 7/1969 | Kater et al. |
| 3,537,292 A | 11/1970 | Federspill |
| 3,700,271 A | 10/1972 | Blaurock et al. |
| 3,838,928 A | 10/1974 | Blaurock et al. |
| 4,248,075 A | 2/1981 | Whitley |
| 4,907,625 A | 3/1990 | Mori |
| 4,981,390 A | 1/1991 | Cramer, Jr. et al. |
| 5,216,811 A | 6/1993 | Jackson et al. |
| 5,235,482 A | 8/1993 | Schmitz |

(Continued)

FOREIGN PATENT DOCUMENTS

| | | |
|---|---|---|
| DE | 3338507 | 11/1984 |
| GB | 687691 | 2/1953 |
| GB | 2342425 | 4/2000 |

*Primary Examiner* — Jefferson Evans

(57) ABSTRACT

A tolerance ring suitable for use in applications such as an actuator assembly for a disk drive, is disclosed. The tolerance ring may be fabricated by steps including stamping a sheet metal section from a strip of sheet metal that has first and second edges that are parallel to a strip axis. A leading axial edge may be rounded from an inner major face and from an outer major face. A plurality of protrusions may be formed from the first major face. The sheet metal section may be bent into a substantially cylindrical shape having a central axis that is normal to the strip axis.

20 Claims, 5 Drawing Sheets

(56) References Cited

U.S. PATENT DOCUMENTS

| | | |
|---|---|---|
| 5,999,373 A | 12/1999 | Allsup et al. |
| 6,046,889 A | 4/2000 | Berding et al. |
| 6,052,890 A | 4/2000 | Malagrino, Jr. |
| 6,061,206 A | 5/2000 | Foisy |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,272,694 B1 | 8/2001 | Knoth |
| 6,288,866 B1 | 9/2001 | Butler |
| 6,288,878 B1 | 9/2001 | Misso et al. |
| 6,292,333 B1 | 9/2001 | Blumentritt et al. |
| 6,333,839 B1 | 12/2001 | Misso et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |

(56) References Cited

U.S. PATENT DOCUMENTS

| | | |
|---|---|---|
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,554,771 B2 | 6/2009 | Hanrahan et al. |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,228,640 B2 | 7/2012 | Woodhead et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,385,024 B2 | 2/2013 | Schmidt et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 * | 10/2013 | Heo .......... G11B 25/043 360/97.12 |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |

(56) References Cited

U.S. PATENT DOCUMENTS

| | | |
|---|---|---|
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 9,022,683 B2 | 5/2015 | Nias et al. |
| 9,255,609 B2 | 2/2016 | Araki et al. |
| 2003/0090114 A1 | 5/2003 | Kang |
| 2006/0181811 A1 | 8/2006 | Hanrahan et al. |
| 2006/0228174 A1 | 10/2006 | Woodhead et al. |
| 2008/0199254 A1 | 8/2008 | Baker et al. |
| 2010/0073820 A1 * | 3/2010 | Slayne ............ F16C 27/04 360/220 |
| 2010/0321833 A1 | 12/2010 | Woodhead et al. |
| 2011/0076096 A1 * | 3/2011 | Slayne ............ F16C 27/02 403/372 |
| 2011/0150375 A1 | 6/2011 | Jaeger et al. |
| 2011/0212281 A1 | 9/2011 | Jacoby et al. |
| 2012/0087044 A1 | 4/2012 | Schmidt et al. |
| 2012/0240350 A1 | 9/2012 | Natu et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |
| 2013/0315664 A1 * | 11/2013 | Nias ............ F16D 1/0835 403/365 |
| 2014/0185164 A1 * | 7/2014 | Nias ............ F16D 1/0829 360/246.8 |
| 2014/0205374 A1 * | 7/2014 | Nias ............ F16D 9/06 403/367 |
| 2014/0313618 A1 | 10/2014 | Araki et al. |
| 2015/0000098 A1 * | 1/2015 | Slayne ............ G11B 5/4813 29/428 |
| 2015/0001025 A1 * | 1/2015 | Slayne ............ F16D 7/021 192/56.1 |
| 2015/0060621 A1 | 3/2015 | Sabounjian |
| 2015/0306655 A1 | 10/2015 | Poliquin |
| 2016/0061270 A1 * | 3/2016 | James ............ F16D 1/0835 16/2.5 |
| 2017/0011761 A1 * | 1/2017 | Araki ............ F16C 17/02 |

* cited by examiner

DISK DRIVE TOLERANCE RING WITH EDGE ROUNDING FROM OPPOSITE MAJOR FACES

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For example, in an optical disk drive, the head will typically include a mirror and objective lens for reflecting and focusing a laser beam on to a surface of the disk.

In a modern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit (FPC) that includes a flex cable. The plurality of HGAs are attached to various arms of the actuator, and each of the laminated flexures of the HGAs has a flexure tail that is electrically connected to the FPC of the HSA.

In magnetic recording applications, the head will typically include a transducer having an inductive writer and a magnetoresistive reader. The head may read and write data on a surface of one of a plurality of co-rotating disks that are co-axially mounted on a spindle motor. Magnetically-written transitions are thereby laid out in concentric circular tracks on the disk surface. In modern disk drives, the tracks must be extremely narrow and the transitions closely spaced to achieve a high density of information per unit area of the disk surface. Still, the disks must rotate quickly so that the computer user does not have to wait long for a desired bit of information on the disk surface to translate to a position under the head.

The required close spacing of data written on the disk surface has consequences on the design of the disk drive device and its mechanical components. Among the most important consequences is that the magnetic transducer on the head must operate in extremely close proximity to the magnetic surface of the disk. However, because there is relative motion between the disk surface and the head due to the disk rotation and head actuation, continuous contact between the head and disk can lead to tribological failure of the interface. Such tribological failure, known colloquially as a "head crash," can damage the disk and head, and cause data loss. Therefore, the magnetic head is typically designed to be hydrodynamically supported by an extremely thin air bearing so that its magnetic transducer can operate in close proximity to the disk while physical contacts between the head and the disk are minimized or avoided.

The head-disk spacing present during operation of modern hard disk drives is extremely small—measuring in the tens of nanometers. Obviously, for the head to operate so closely to the disk, the head-disk interface must be kept clear of debris and contamination—even microscopic debris and contamination. Tribological problems in magnetic disk drives sometimes have non-obvious causes that, once known, understood, and accounted for, give one disk drive manufacturer a competitive edge over another. In addition to tribological consequences, contamination and debris at or near the head disk interface can force the head away from the disk. The resulting temporary increases in head-disk spacing cause magnetic read/write errors. Accordingly, magnetic hard disk drives are assembled in clean-room conditions and the constituent parts are subjected to pre-assembly cleaning steps during manufacture.

In many disk drives, the actuator arm (or arms) that positions the head(s) extends from an actuator body that is fixed to an actuator pivot bearing by a tolerance ring. Typically, tolerance rings include a cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents axial slippage of the mating parts. For example, in disk drive applications, the radial compressive preload of the tolerance ring prevents separation and slippage at the interface between the actuator arm body and the pivot bearing during operation and during mechanical shock events. The tolerance ring also acts as a radial spring. In this way, the tolerance ring positions the interior cylindrical part relative to the exterior cylindrical part while making up for radial clearance and manufacturing variations in the radius of the parts.

State of the art tolerance rings are typically manufactured from a flat metal sheet with stamping, forming, rolling, and other steps to provide raised or recessed contacting regions and a final generally-cylindrical shape. Installation of the tolerance ring involves axial motion relative to a generally cylindrical hole in an exterior part (e.g. actuator arm) and/or relative to a generally cylindrical inner part (e.g. actuator pivot bearing). Such tolerance ring installation may shear metal fragments from either the actuator arm body or an outer surface of the actuator pivot bearing cartridge, and such fragments can later contaminate the head-disk interface and ultimately lead to a head crash and possibly to data loss.

The actuator arm structure is typically fabricated from aluminum or an alloy of aluminum and is therefore typically softer and more easily scratched by the tolerance ring than is the actuator pivot bearing cartridge, which may be fabricated from stainless steel. Still, the tolerance ring may scrape the outer surface of the actuator pivot bearing during installation, even if the actuator pivot bearing cartridge is fabricated from stainless steel. Consequently, the installation of a conventional tolerance ring is somewhat prone to generate debris.

Most state-of-the-art attempts to improve cleanliness of disk drive components have focused on pre- and post-assembly cleaning steps and on environmental cleanliness during assembly. Assembly in clean environments also does not eliminate or remove contaminates and debris thoroughly. Less frequently, disk drive designers consider the generation of debris and contamination earlier in the design of sub-components. Still, such consideration is often restricted to the selection of lubricants and adhesives. Consequently, there remains much scope in the art for reducing debris generation via novel changes to the basic design or assembly of various sub-components of the disk drive.

Therefore, there is a need in the art for a tolerance ring design and/or tolerance ring fabrication method that can reduce the creation of debris during disk drive assembly. Although the need in the art was described above in the context of magnetic disk drive information storage devices, the need is also present in other applications where a tolerance ring is used in a clean environment that must remain as free as possible of debris and contaminants.

DETAILED DESCRIPTION OF EXAMPLE EMBODIMENTS

Figure 1:
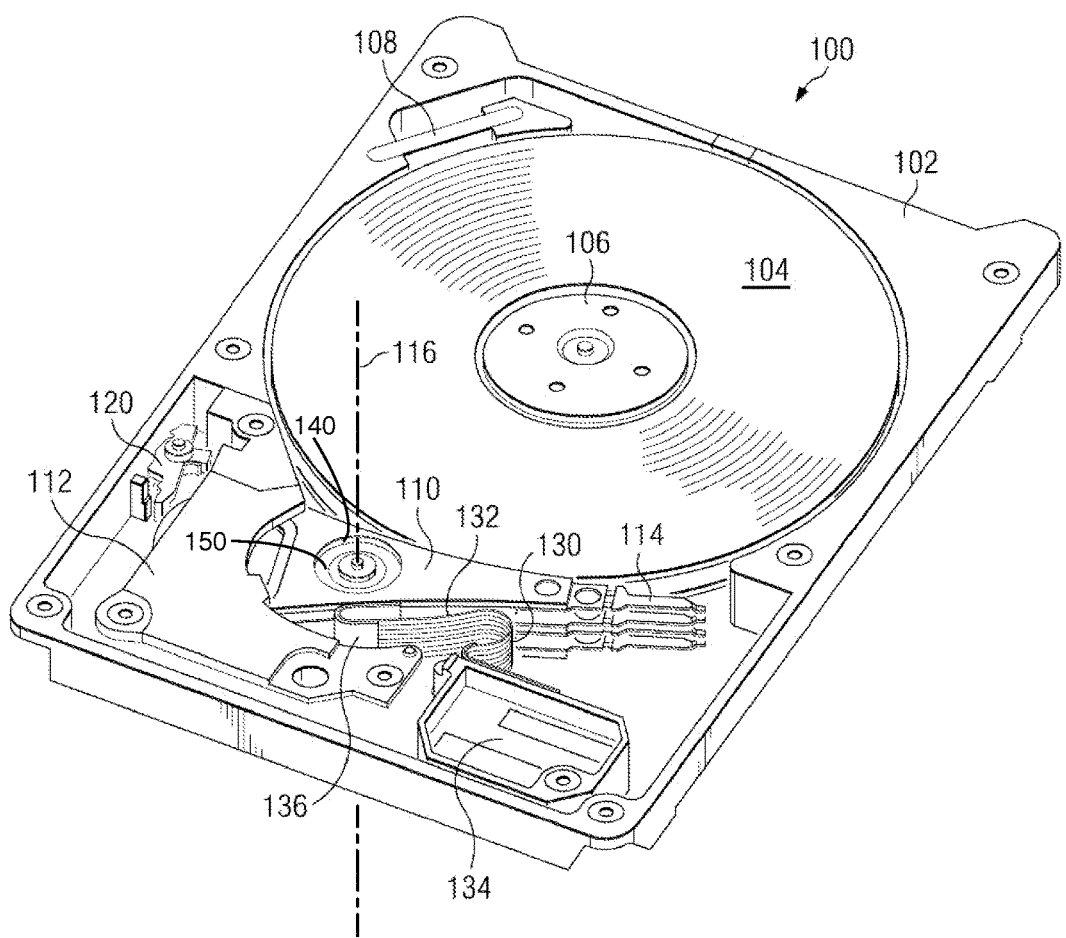
FIG. 1 is a perspective view of a conventional disk drive (without any cover shown so that interior parts may be viewed).

FIG. 1 is top perspective view of a conventional disk drive 100. The disk drive 100 includes a disk drive base 102 and two annular magnetic disks 104. The disks 104 include opposing disk surfaces which may include one or more magnetic layers. Data may be recorded along data tracks on a single disk surface or both. The disk drive 100 further includes a spindle 106, rotatably mounted on the disk drive base 102, for rotating the disks 104. The rotation of the disks 104 establishes air flow through recirculation filter 108. Disk drives like disk drive 100 may have only a single disk 104, or alternatively, two or more disks 104.

The disk drive 100 further includes an actuator 110 that is pivotably mounted on the disk drive base 102. Specifically, the actuator 110 is pivotably attached to the disk drive base 102 by a pivot bearing cartridge 150 that is disposed within a cylindrical bore 140 of the actuator 110. Voice coil motor 112 rotates the actuator 110 through a limited angular range about an actuator pivot axis 116, so that at least one head gimbal assembly (HGA) 114 is desirably positioned relative to one or more tracks of information on a corresponding one of the disks 104. The actuator 110 may occasionally be latched at an extreme angular position within the limited angular range, by latch 120.

The disk drive of FIG. 1 includes four HGAs 114, each of which corresponds to a surface of one of the two disks 104. However fewer or more HGAs may be included depending on the number of disks 104 that are included and whether the disk drive 100 is depopulated. Each HGA 114 includes a read head (too small to be depicted in FIG. 1) with a transducer for at least reading data from a disk surface. The transducer may include both a read element and a writer, but the term read head will be used herein to refer to any head that can read, even if it also performs other functions such as writing, air bearing modulation, microactuation, etc. In optical and magneto-optical recording applications, the head may also include an objective lens and an active or passive mechanism for controlling the separation of the objective lens from a disk surface of the disk 104.

Electrical signals to/from the HGAs 114 are carried to other drive electronics via a flexible printed circuit 130, which includes a flex cable 132, a flex cable bracket 134 that is attached to the disk drive base 102, and a flex stiffener 136 that is attached to the body of the actuator 110. The flex cable 132 runs from the actuator 110 to the flex cable bracket 134. The flex cable bracket 134 may include a connector protruding from its underside, to electrically couple the flex cable 132 to a printed circuit board attached to the underside of the disk drive base 102 outside the disk drive enclosure.

Figure 2:
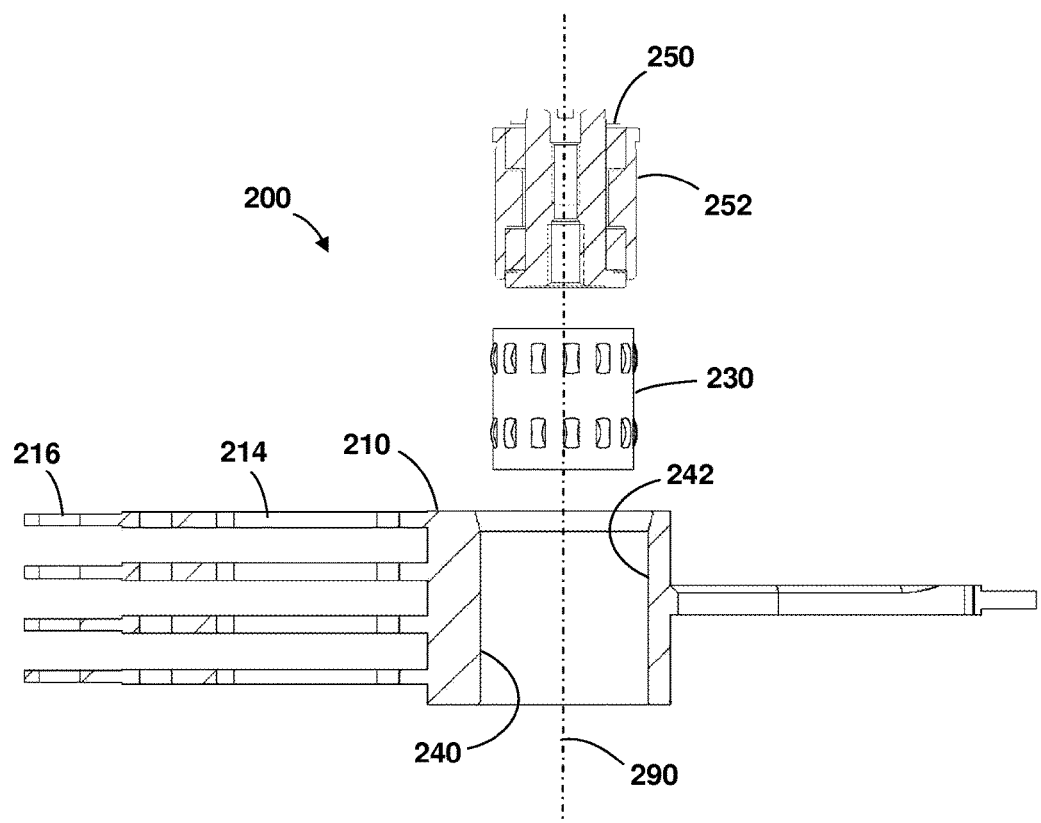
FIG. 2 is an exploded view of a disk drive actuator arm assembly including a tolerance ring that is capable of including an embodiment of the present invention.

FIG. 2 is an exploded view of a disk drive actuator arm assembly 200 including a tolerance ring 230 that is capable of including an embodiment of the present invention. Tolerance ring 230 may be designed to fit outside of actuator pivot bearing cartridge 250 and inside a cylindrical bore 240 in an actuator arm body 210. In this context, a bore is considered cylindrical if it has at least one inner surface that is cylindrical. The cylindrical bore 240 may have a tapered end, as shown in FIG. 2.

In the example of FIG. 2, at least one actuator arm 214 protrudes from the actuator body 210 in a direction approximately normal to an actuator pivot axis 290. A distal end 216 of the actuator arm 214 is adapted for attachment of a read head, for example by conventional swaging of a head gimbal assembly that includes the read head. The "tolerance ring" 230 may sometimes be referred to as being an "interference band," and those terms are used synonymously herein. The tolerance ring 230 is disposed in a radial clearance space between an outer surface 252 of the pivot bearing 250 and an inner surface 242 of the cylindrical bore 240 in the actuator body 210.

Figure 3:
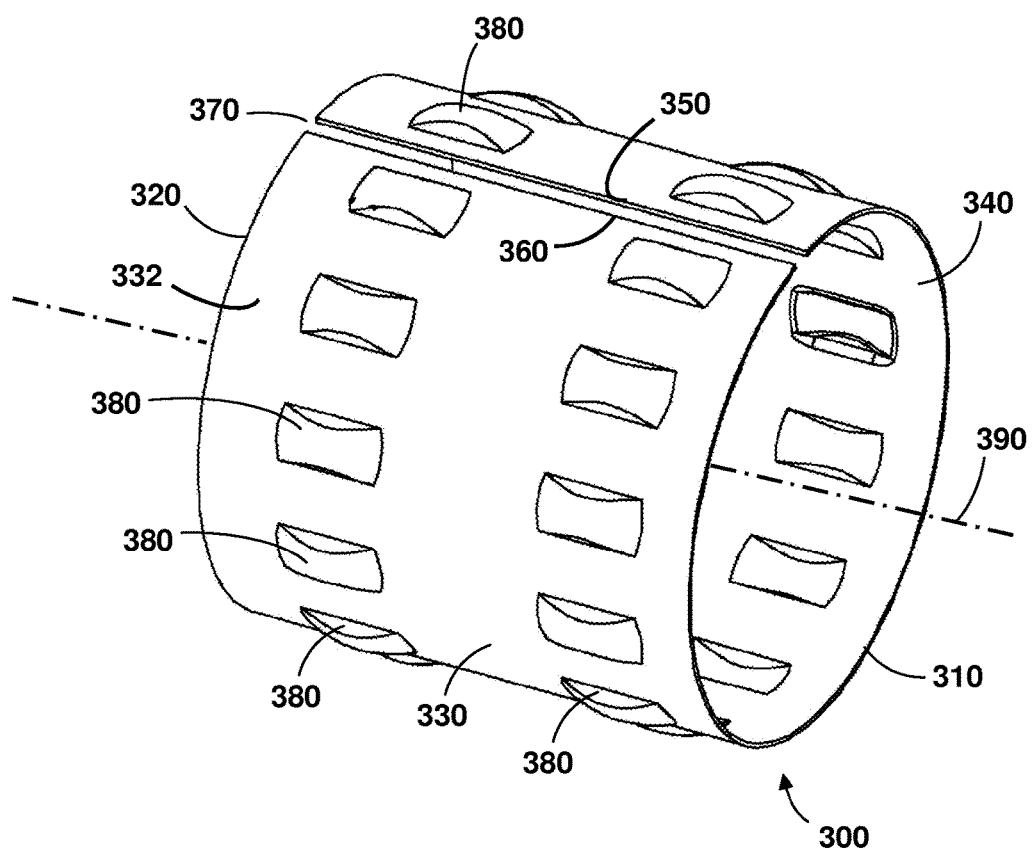
FIG. 3 is a perspective view of a contemporary tolerance ring that is capable of including an embodiment of the present invention.

FIG. 3 is a perspective view of a contemporary tolerance ring (i.e. interference band) 300 that is capable of including an embodiment of the present invention. The tolerance ring 300 has a cylindrical base portion 330 and a plurality of bumps 380 that protrude radially. In this context, the radial direction is normal to a central axis 390 of the cylindrical base portion 330. Note that the central axis 390 of the cylindrical base portion 330 is approximately coincident with the actuator pivot axis. Radial expansion and contraction of the tolerance ring 300 is facilitated by a gap 370 in the circumference of the tolerance ring 300. The gap 370 is disposed between gap edges 350, 360 that run parallel with the central axis 390 of the cylindrical base portion 330.

In the example of FIG. 3, the tolerance ring 300 includes an inner major face 340 that faces an outer surface of a pivot bearing (e.g. outer surface 252 shown in FIG. 2), and the tolerance ring 300 includes an outer major face 332 that faces an inner surface of an actuator cylindrical bore (e.g. inner surface 242 shown in FIG. 2). In the example of FIG. 3, the tolerance ring 300 includes axially-leading and axially-trailing circumferential edges 310, 320, that are each capable of being rounded from the inner major face 340 and from the outer major face 332 according to an embodiment of the present invention.

For example, one or both of the axially-leading and-axially trailing circumferential edges 310, 320 may be rounded from the inner major face 340 and from the outer major face 332 by coining or skiving. Specifically, and now referring additionally to FIG. 4, a tolerance ring fabrication process according to an embodiment of the present invention may include stamping a sheet metal section 400 from a strip of sheet metal. In certain embodiments, the sheet metal may comprise stainless steel that optionally has a sheet thickness in the range of 0.076 to 0.100 mm.

Figure 4:
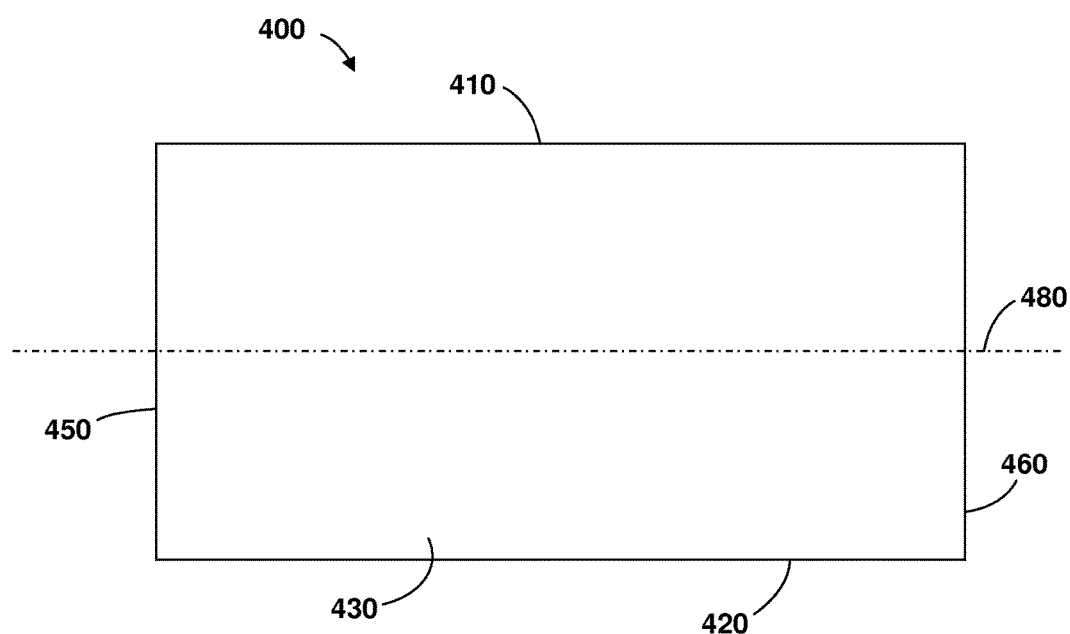
FIG. 4 depicts an intermediate stage of a tolerance ring fabrication process.

The sheet metal section 400 may have first and second edges 410, 420 that are parallel to a strip axis 480. The sheet metal section 400 (and the sheet metal strip from which it was stamped) may have a first major face 430 (facing the viewer in FIG. 4) that is opposite a second major face (facing away from the viewer in FIG. 4). In the example of FIG. 4, the sheet metal section 400 is a rectangular blank having third and fourth edges 450, 460 that are normal to the strip axis 480. However, other blank shapes are contemplated, such as other simple quadrilateral shapes or more complex shapes (e.g. in which the third and/or fourth edges 450, 460 may form acute or obtuse angles or include notches or tabs, etc.)

Figure 5:
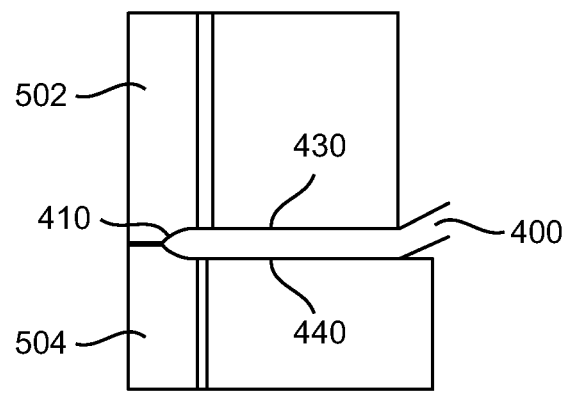
FIG. 5 is a cross-sectional depiction of an edge coining process that may be used according to an embodiment of the present invention.

The first edge 410 and/or the second edge 420 may be rounded from the first major face 430 and from the second major face (facing away from the viewer in FIG. 4 by skiving of the sheet metal strip before the sheet metal section 400 is stamped therefrom). Alternatively, and as shown in FIG. 5, the first edge 410 may be rounded from the first major face 430 of the sheet metal section 400 and from the opposite second major face 440 of the sheet metal section 400 by coining, for example by violent compression of coining tool parts 502, 504 together.

Before or after the edge rounding process, a plurality of protrusions (e.g. bumps 380 of FIG. 3) may be formed from the first major face 430 of the sheet metal section depicted in FIG. 4. Alternatively, forming the plurality of protrusions from the first major face 430 may comprise forming a plurality of conventional full-length corrugations or waves in the sheet metal section 400.

Subsequently, the sheet metal section 400 of FIG. 4 may be bent into a substantially cylindrical shape having a central axis (e.g. central axis 390 of FIG. 3) that is normal to the strip axis 480. After such bending, the third and fourth edges 450, 460 of the sheet metal section 400 may optionally be parallel to the central axis of the cylindrical tolerance ring (e.g. central axis 390 of FIG. 3). A circumferential gap (e.g. circumferential gap 370 of FIG. 3) is preferably left between the third and fourth edges 450, 460 of FIG. 4, after bending, so that the resulting tolerance ring has a cross-section (taken normal to the central axis) that is C-shaped after bending.

Figure 6:
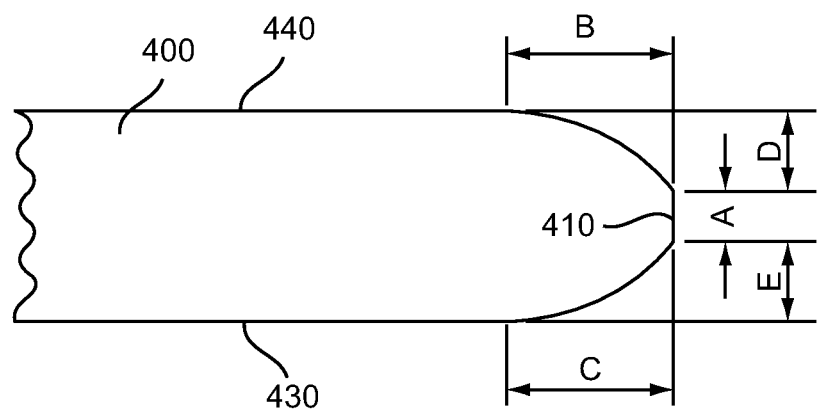
FIG. 6 depicts an axially-leading or axially-trailing circumferential edge of a tolerance ring, according to an embodiment of the present invention.

After the edge rounding process, the axially-leading and/or axially-trailing circumferential edge 410 of the sheet metal section 400 may have a cross-sectional shape as depicted in FIG. 6. Now referring to FIGS. 4 and 6, the first edge 410 is rounded by a rounding depth E from the first major face 430. In the embodiment of FIG. 6, the first edge 410 is also rounded by a rounding depth D from the second major face 440. In certain embodiments the rounding depths D and E are each preferably at least 15% of the total sheet thickness A+E+D.

In the embodiment of FIGS. 4 and 6, the rounding of the first edge 410 from the first major face 430 extends away from the first edge 410 by a rounding distance C that is measured parallel to the central axis of the tolerance ring (e.g. central axis 390 of FIG. 3) Likewise, the rounding of the first edge 410 from the second major face 440 extends away from the first edge 410 by a rounding distance B that is similarly measured. In certain embodiments, the rounding distances B and C are each preferably in the range of 0.025 mm to 0.140 mm. The rounding of the second edge 420 may have a similar cross-section to that of the first edge 410.

In certain embodiments the foregoing dimensional limitations on the rounded cross-sectional profile of the axially-leading and axially-trailing edges may advantageously reduce debris generated by tolerance ring and/or pivot bearing installation during disk drive assembly.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive, comprising:
    a disk drive base;
    a spindle rotatably mounted on the disk drive base;
    a disk attached to the spindle; and
    a head actuator pivotably mounted on the disk drive base by a pivot bearing defining a pivot axis, the pivot bearing secured within a bore of the head actuator by a tolerance ring;
    wherein the tolerance ring is formed from a metal sheet and comprises:
    a sheet-metal cylinder comprising a first side of the metal sheet forming an inner surface facing towards the pivot axis and extending along an axial length of the sheet-metal cylinder and an opposing second side of the metal sheet forming an outer surface facing away from the pivot axis towards the actuator bore and extending along the axial length of the sheet-metal cylinder; and
    a plurality of protrusions extending radially from the sheet-metal cylinder;
    wherein the sheet-metal cylinder has a substantially uniform thickness outside of the plurality of protrusions;
    wherein a first end of the sheet-metal cylinder comprises a first edge about the pivot axis, and the first end is rounded from the inner surface and from the outer surface.

2. The disk drive of claim 1, wherein a second end of the sheet-metal cylinder comprises a second edge about the pivot axis, and the second end is rounded from the inner surface and from the outer surface.

3. The disk drive of claim 2, wherein the second edge is rounded from the inner surface and from the outer surface for an axial rounding distance away from the second edge, measured parallel to the pivot axis, that is in the range of 0.025 mm to 0.140 mm.

4. The disk drive of claim 1, wherein the sheet-metal cylinder includes a circumferential gap so that the sheet-metal cylinder does not completely encircle the pivot axis, the sheet-metal cylinder including third and fourth edges that are parallel to the pivot axis, the circumferential gap being disposed between the third and fourth edges.

5. The disk drive of claim 1, wherein the plurality of protrusions comprise bumps that extend radially outward from the sheet-metal cylinder.

6. The disk drive of claim 1, wherein the plurality of protrusions comprise corrugations.

7. The disk drive of claim 1, wherein the sheet-metal cylinder comprises stainless steel having the substantially uniform thickness between the inner and outer surfaces that is in the range of 0.076 to 0.100 mm.

8. The disk drive of claim 1, wherein the first edge is rounded by a rounding depth of at least 15% of the substantially uniform thickness, from each of the inner and outer surfaces.

9. The disk drive of claim 8, wherein the substantially uniform thickness is greater than twice the rounding depth, so that a cross-section of the first edge includes a middle unrounded flat normal to the pivot axis.

10. The disk drive of claim 1, wherein the first edge is rounded from the inner surface and from the outer surface for an axial rounding distance away from the first edge, measured parallel to the pivot axis, that is in the range of 0.025 mm to 0.140 mm.

11. A tolerance ring formed from a metal sheet, the tolerance ring comprising:
- a sheet-metal cylinder defining a central axis, a first side of the metal sheet forming an inner surface facing towards the central axis and extending along an axial length of the sheet-metal cylinder, and an opposing second side of the metal sheet forming an outer surface facing away from the central axis and extending along an axial length of the sheet-metal cylinder; and
- a plurality of protrusions extending radially from the sheet-metal cylinder;
- wherein the sheet-metal cylinder has a substantially uniform thickness outside of the plurality of protrusions;
- wherein a first end of the sheet-metal cylinder comprises a first edge about the central axis, and the first end is rounded from the inner surface and from the outer surface.

12. The tolerance ring of claim 11, wherein a second end of the sheet-metal cylinder comprises a second edge about the central axis, and the second end is rounded from the inner surface and from the outer surface.

13. The tolerance ring of claim 12, wherein the second edge is rounded from the inner surface and from the outer surface for an axial rounding distance away from the second edge, measured parallel to the central axis, the axial rounding distance being in the range of 0.025 mm to 0.140 mm.

14. The tolerance ring of claim 11, wherein the sheet-metal cylinder includes a circumferential gap so that the sheet-metal cylinder does not completely encircle the central axis, the sheet-metal cylinder including third and fourth edges that are parallel to the central axis, the circumferential gap being disposed between the third and fourth edges.

15. The tolerance ring of claim 11, wherein the plurality of protrusions comprise bumps that extend radially outward from the sheet-metal cylinder.

16. The tolerance ring of claim 11, wherein the plurality of protrusions comprise corrugations.

17. The tolerance ring of claim 11, wherein the sheet-metal cylinder comprises stainless steel having the substantially uniform thickness between the inner and outer surfaces that is in the range of 0.076 to 0.100 mm.

18. The tolerance ring of claim 11, wherein the first edge is rounded by a rounding depth of at least 15% of the substantially uniform thickness, from each of the inner and outer surfaces.

19. The tolerance ring of claim 18, wherein the substantially uniform thickness is greater than twice the rounding depth, so that a cross-section of the first edge includes a middle unrounded flat normal to the central axis.

20. The tolerance ring of claim 11, wherein the first edge is rounded from the inner surface and from the outer surface for an axial rounding distance away from the first edge, measured parallel to the central axis, that is in the range of 0.025 mm to 0.140 mm.

* * * * *